United States Patent
Payne et al.

(10) Patent No.: US 7,050,206 B2
(45) Date of Patent: May 23, 2006

(54) DOCUMENT CAPTURE DEVICE

(75) Inventors: David M. Payne, Star, ID (US); John W. Huffman, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 932 days.

(21) Appl. No.: 09/976,136

(22) Filed: Oct. 10, 2001

(65) Prior Publication Data

US 2003/0067634 A1   Apr. 10, 2003

(51) Int. Cl.
  *H04N 1/04* (2006.01)
  *H04N 1/387* (2006.01)
  *G03G 15/30* (2006.01)
  *G06K 15/00* (2006.01)
  *H01L 27/00* (2006.01)

(52) U.S. Cl. ............. 358/488; 358/486; 358/497; 358/474; 358/453; 399/379; 399/380; 399/211; 382/312; 382/319; 250/208.1

(58) Field of Classification Search ............. 358/475, 358/497, 487, 474, 494, 488, 486, 453; 399/379, 399/380, 211; 382/312, 319; 250/208.1
See application file for complete search history.

(56) References Cited

U.S. PATENT DOCUMENTS

| | | | |
|---|---|---|---|
| 4,891,667 A | | 1/1990 | Bruce, Jr. ............. 355/230 |
| 5,285,237 A | * | 2/1994 | Parulski et al. ............. 355/75 |
| 5,448,340 A | * | 9/1995 | Ogiri et al. ............. 399/369 |
| 5,546,144 A | * | 8/1996 | Lam et al. ............. 353/120 |
| 5,818,610 A | * | 10/1998 | Bromley et al. ............. 358/473 |
| 6,233,065 B1 | * | 5/2001 | Lee ............. 358/475 |
| 6,870,648 B1 | * | 3/2005 | Sesek et al. ............. 358/488 |

* cited by examiner

*Primary Examiner*—Edward Coles
*Assistant Examiner*—Houshang Safaipour

(57) ABSTRACT

A document capture arm connected to an imaging device and positionable over a platen for retaining a document on the platen for imaging. The document capture arm holds one or more documents against the platen in a selected position or arrangement. The document capture arm may be configured as an arm that may insert into a receiver. The document capture arm may be easily installed for use and may be easily removed for storage when not needed. Alternately, the document capture arm may include an actuator that is attached to and extends from the arm, projecting beyond the axis of rotation of the platen cover at the hinge. When the platen cover is lifted to an open position, the capture arm actuator is acted upon by the platen cover, lifting the document capture arm to an open position.

20 Claims, 8 Drawing Sheets

DOCUMENT CAPTURE DEVICE

BACKGROUND OF THE INVENTION

1. Technical Field

The present invention relates generally to imaging devices and more particularly to a device that aides placement and ensures accurate retention of documents on a platen of a flatbed imaging device during an imaging process.

2. Background Art

Flatbed imaging devices including electrostatic and electronic document scanners and copiers as well as multi-function peripherals typically require a face-down placement of a document upon a transparent platen. An imaging assembly is typically positioned below the platen and is configured to obtain digital image data representative of an image represented on a sheet document. A transport assembly transports the imaging assembly in a plane substantially parallel to the plane of the platen. Image data includes data relating to the position and alignment of the document on the platen.

Flatbed imaging devices typically include a hinged platen cover that serves several purposes. The platen cover may serve both as a weight to hold a document as flat as possible and as an appropriately colored background for a document that does not require the entire functional area of the platen. Additionally, the platen cover may include a document feeding mechanism for automatically feeding a document onto the platen for automated multiple-document imaging.

A platen including a larger functional surface allows for imaging a wider range of original document, but an oversized platen may also present alignment problems when a user places curled, distorted, odd-shaped, small, multiple, or lightweight document on the platen. Curled, distorted, odd-shaped, small, multiple, or lightweight originals shift out of position easily.

Closing and opening the platen cover may exacerbate the problem. Air turbulence caused by relative movement of the two large flat planes of the platen and the platen cover can easily shift the position of the original document, whether during closing the platen cover for imaging or during opening for adjustment of the originals. This problem is particularly evident when imaging curled items like thermal facsimile papers, lightweight document such as receipts, or multiple smaller originals such as photographs or checks (see FIGS. 1 through 3).

Consequently, accurately positioning any document other than the most common sizes of originals requires tedious care and sometimes multiple readjustments to obtain a single usable image. This problem can result in inaccurate imaging, waste of operator time, waste of resources, and undue wear and tear on the imaging device.

Therefore, it may be advantageous to provide a simple and low-cost device that will easily capture any assortment or single piece of document, whether curled, distorted, odd-shaped, small, multiple, or lightweight, securely against the imaging platen throughout the manual placement, imaging, and readjustment of the original document and the opening and closing of the platen cover. It may also be advantageous to provide a device that automatically articulates to provide ease of operation. Additionally, there may be advantage in preserving an existing alignment of the document when the platen cover is opened for adjustment to the position of the document. It may also be of advantage to provide a device that incorporates an indexing device to aid in more precise alignment of original documents. It may also be advantageous to allow manipulation of the platen cover, capturing device, and document with only one hand, allowing ease of operation and one-handed operation. There may also be advantage found in allowing the platen cover to stay in any one of multiple tactile positions while the document and capturing device are manipulated.

SUMMARY OF THE INVENTION

The present invention is directed to a document capture arm connected to an imaging device, the document capture arm positionable over a platen for retaining a document on the platen for imaging. The document capture arm holds one or more documents against the platen in a selected position or arrangement. The document capture arm may include any member that attaches to the imaging device and projects over the platen for retaining a document against a platen of an imaging device. The document capture arm may include indexing marks which assist accurate positioning of a document under the arm. The document capture arm may be formed of a plastic or other suitable material. The document capture arm may be formed of a flexible material. The document capture arm may be formed of transparent material. The document capture arm may be formed having one or more apertures formed through a cross-section of the document capture arm and which serve as air holes for reducing air pressure and turbulence against the platen when the document capture arm is raised or lowered.

In one embodiment of the invention, a first end of a document capture arm may be inserted into a receiver connected to an imaging device. The first end of the document capture arm may configured as a tongue or a tongue including a tang for insertion into the receiver. This feature of the invention allows for a more positive engagement with the receiver. The document capture arm may be easily installed for use and may be easily removed for storage when not needed.

In another embodiment of the invention, a document capture arm actuator may extend from an end of the document capture arm, projecting beyond an axis of rotation of the platen cover at the hinge. When the platen cover is lifted to an open position, the capture arm actuator is acted upon by the platen cover lifting the document capture arm to an open position allowing placement or removal of documents on the platen. When the platen cover is partially open, the document capture arm swings down to capture the documents in position leaving the document visible and adjustable by the operator.

In one preferred embodiment of the invention, when the platen cover is fully open, a capture arm actuator automatically lifts the document capture arm to an arm up position, to allow free placement of document on the platen. With the platen cover partially open, the actuator allows the document capture arm to swing down and capture the document in the selected position against the platen without movement. At this partially open position, the document capture arm leaves the document visible to an operator while remaining adjustable. As the platen cover closes completely, the document capture arm retains the document securely in the selected position. In one embodiment of the invention, a closing mechanism may serve to assist a firm or rapid closure of the document capture arm against the platen. This feature may be accomplished employing cams, springs or combinations thereof to effect the firm or rapid closure of the document capture arm.

In one preferred embodiment of the invention, the hinge includes a slip clutch formed between opposing faces of the cover and housing hinge portions. The slip clutch allows one or more intermediate positions to be defined wherein the cover, and therefore the document capture arm, are frictionally retained at a selected angular position due to the friction between the opposing slip clutch faces. This allows one-handed manipulation of the document, the document capture arm, and the platen cover.

The present invention consists of the combination and arrangement of parts hereinafter more fully described, illustrated in the accompanying drawings and more particularly pointed out in the appended claims, it being understood that changes may be made in the form, size, proportions and minor details of construction without departing from the spirit or sacrificing any of the advantages of the invention.

DETAILED DESCRIPTION

Figure 1:
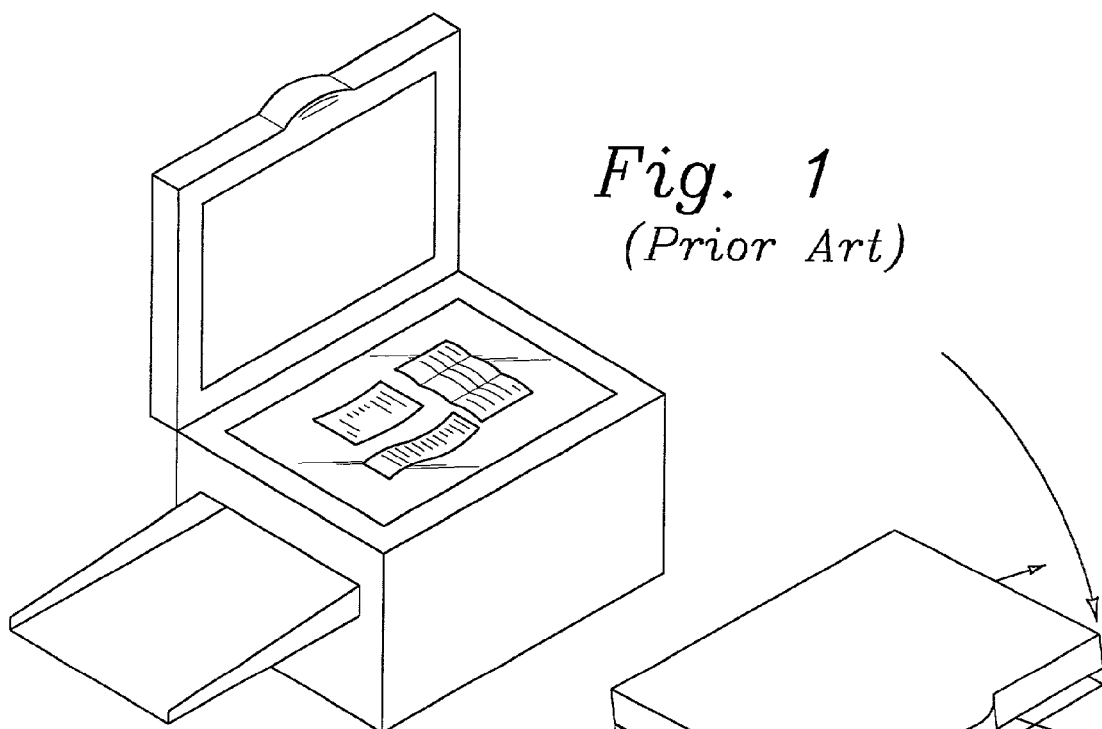
FIG. 1 is a representative perspective view of an imaging device according to the prior art showing several documents positioned on a transparent platen.
Figure 2:
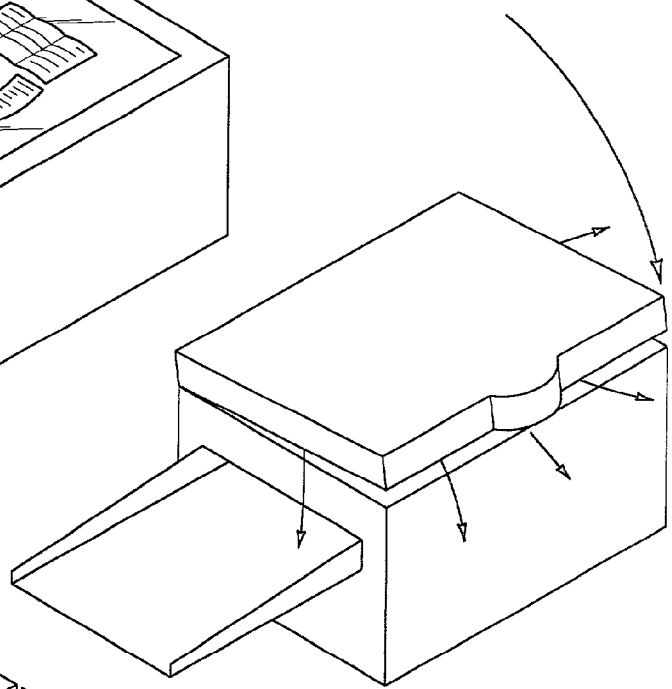
FIG. 2 is a representative perspective view of an imaging device according to the prior art.
Figure 3:
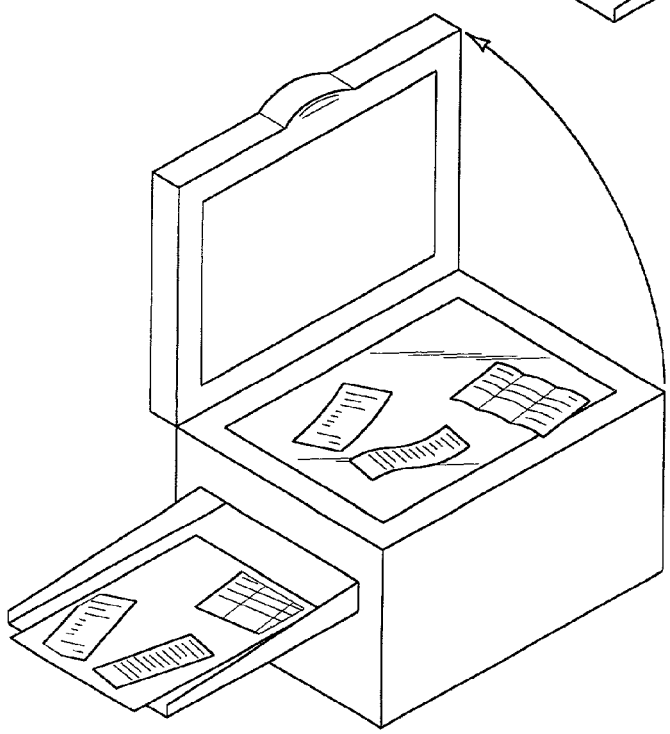
FIG. 3 is a representative perspective view of an imaging device according to the prior art showing several documents repositioned on a transparent platen as a result of air turbulence on documents and a resulting image produced by the imaging device.
Figure 4:
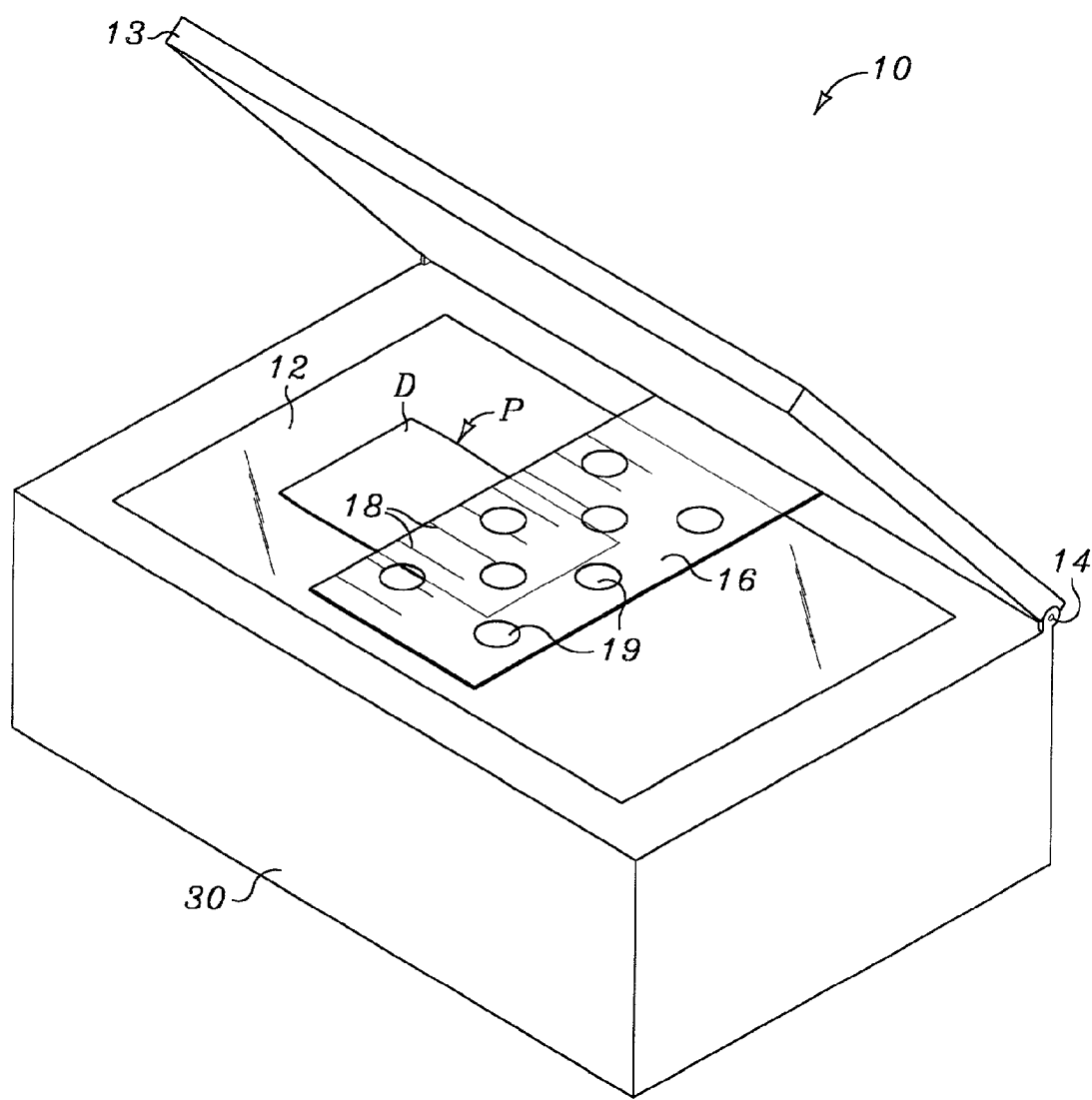
FIG. 4 is a representative perspective view of an imaging device including a document capture arm according to the invention.

FIG. 4 shows imaging device 10 including imaging device housing 30 and cover 13. Transparent platen 12 is located on an upper surface of imaging device housing 30. Imaging device 10 also includes cover 13 shown in an open position. Cover 13 is hingedley connected to imaging device housing 30 at hinge 14 to close over transparent platen 12. Imaging device 10 also includes document capture arm 16, which holds document D in selected position P on transparent platen 12. Document capture arm 16 is pivotally disposed between platen 12 and cover 13 at hinge 14. Document capture arm 16 includes indexing marks 18 which assist accurate positioning of document D on platen 12. Document capture arm 16 also includes apertures 19 which reduce air pressure and turbulence that may be caused by lowering and raising document capture arm 16 relative to document D and platen 12.

Figure 5:
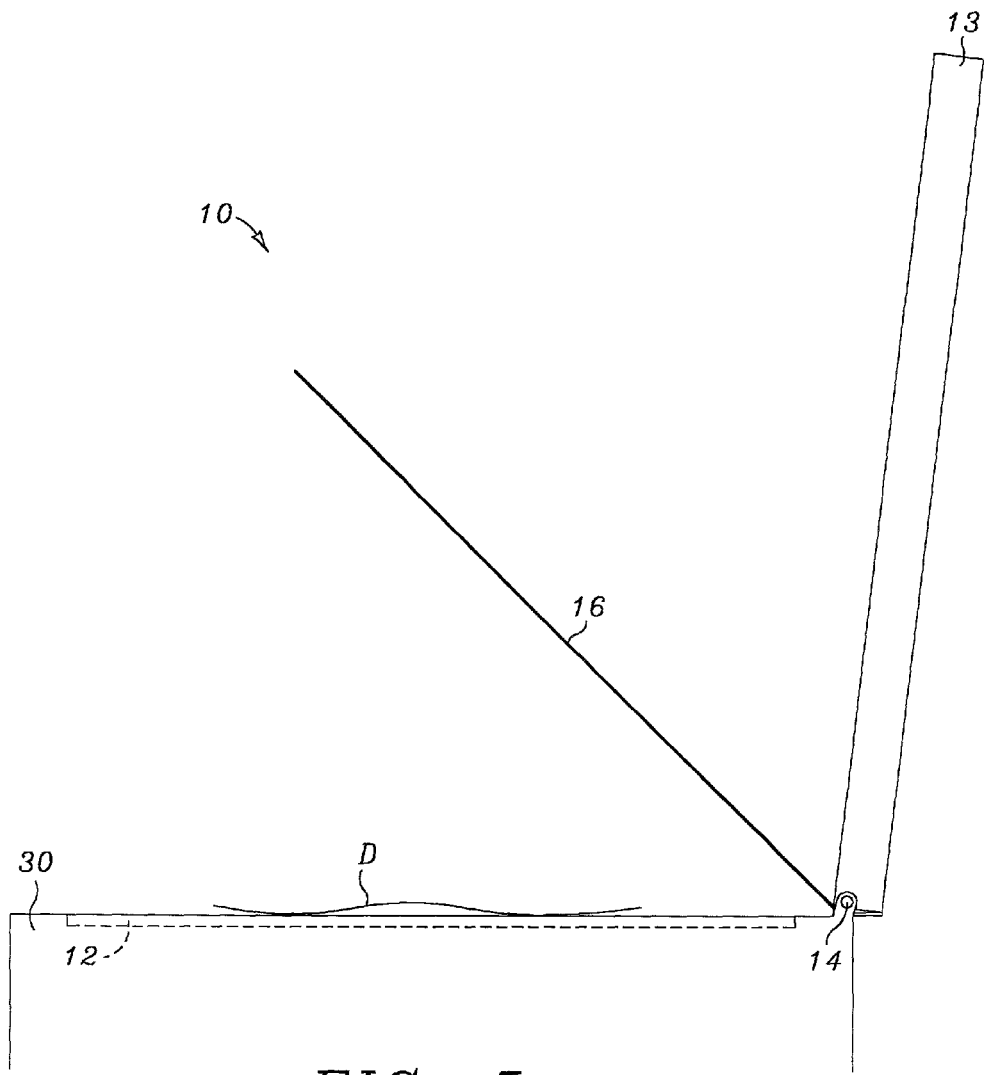
FIG. 5 is a representative side view of an imaging device including a document capture arm according to the invention.
Figure 6:
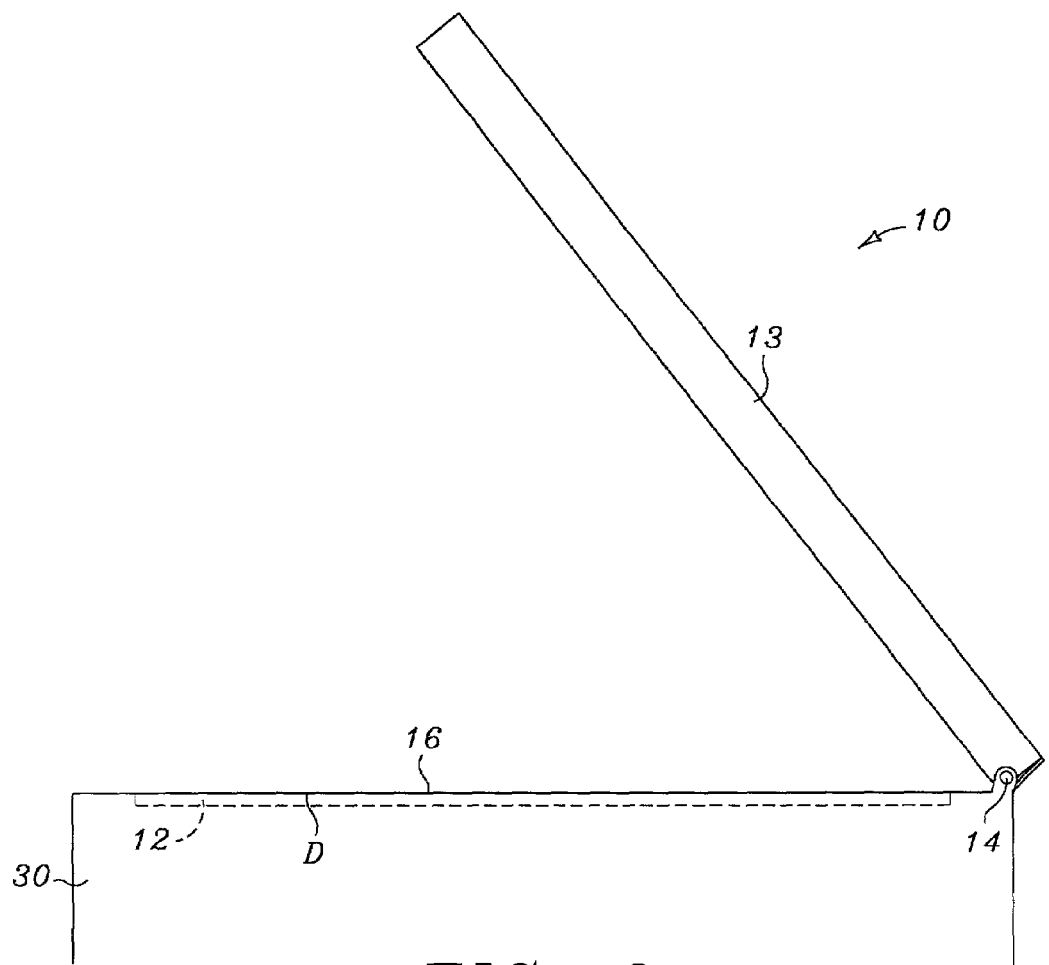
FIG. 6 is a representative side view of an imaging device including a document capture arm according to the invention.
Figure 7:
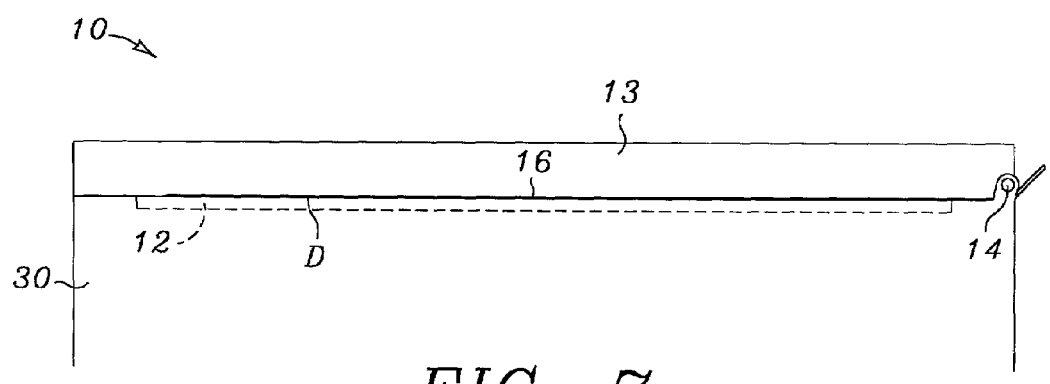
FIG. 7 is a representative side view an imaging device including a document capture arm according to the invention.

FIGS. 5 through 7 are representative side cross sectional views of imaging device 10 including cover 13 hingedly attached to imaging device housing 30 at hinge 14. Document capture arm 16 is pivotally disposed between cover 13 and transparent platen 12. Cover 13 is shown in open, partially open and closed positions in FIGS. 5 through 7 respectively.

Figure 8:
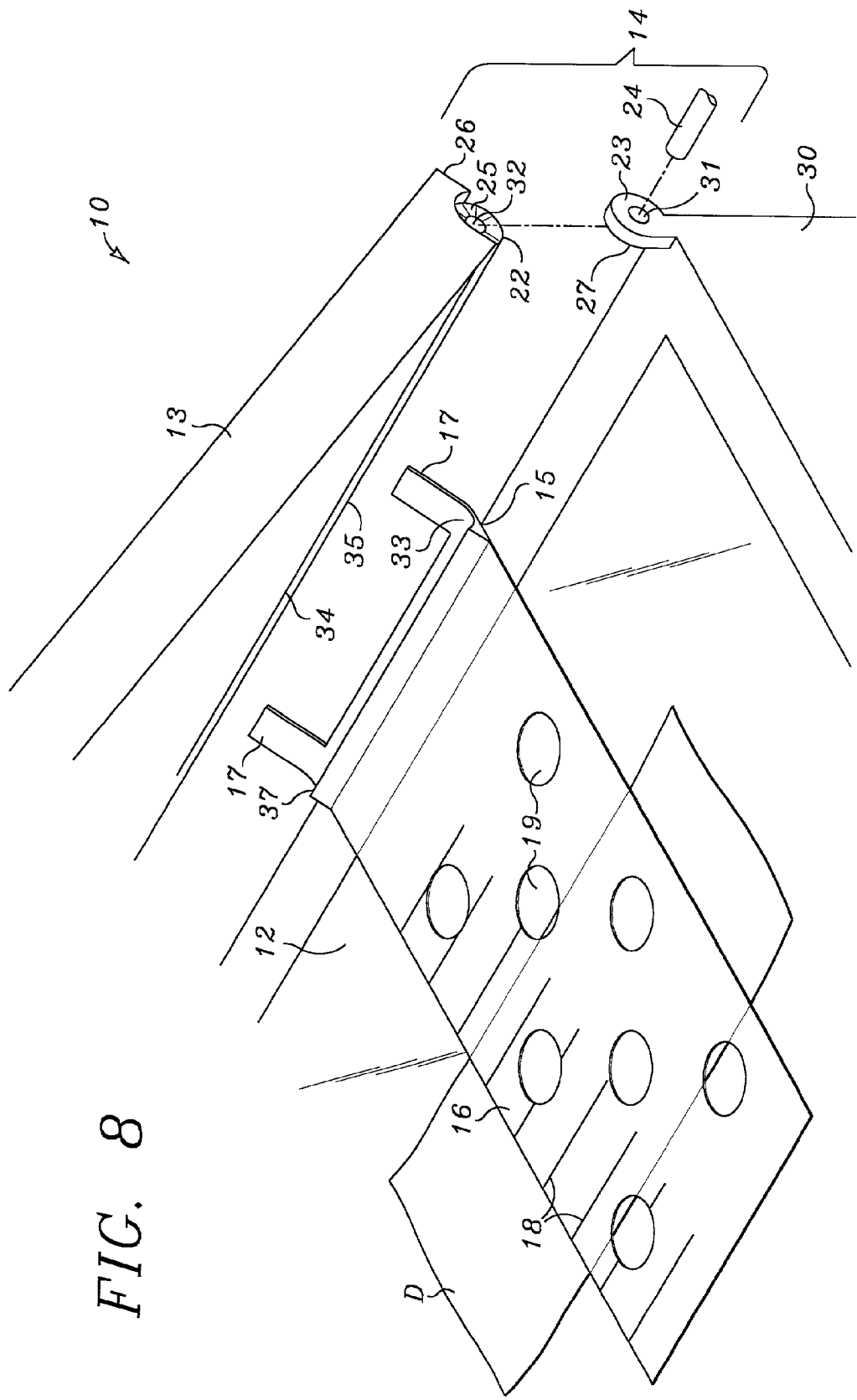
FIG. 8 is a representative perspective exploded detail of a cover and hinge assembly of an imaging device including a document capture arm according to the invention.

FIG. 8 shows imaging device 10 including imaging device housing 30 and cover 13. Transparent platen 12 is located on an upper surface of imaging device housing 30. Imaging device 10 also includes document capture arm 16. Document capture arm 16 includes indexing marks 18 which assist accurate positioning of document D on platen 12 and apertures 19 which reduce air pressure and turbulence that may be caused by lowering and raising document capture arm 16 relative to document D and platen 12.

FIG. 8 shows hinge 14 in exploded detail. Hinge 14 includes hinge cover portion 22 and hinge housing portion 23 which are pivotally connected by hinge pin 24. In the embodiment of the invention shown in FIG. 8, hinge pin 24 projects through aperture 31 of hinge housing portion 23 and aperture 32 of hinge cover portion 22. In this case, document capture arm 16 is removable as described more completely in reference to FIGS. 9 through 11. First slip clutch face 25 is formed on the face of hinge cover portion 22 and second slip clutch face 27 is formed on the face of hinge housing portion 23. When assembled, friction between opposing first slip clutch face 25 and second slip clutch face 27 frictionally holds cover 13 at selected angular cover positions. Because of its coordinated manipulation with cover 13, document capture arm 16 is frictionally positionable at corresponding selected angular capture arm positions. This feature allows an operator to manipulate document D without holding cover 13 and document capture arm 16 at the same time.

FIGS. 8 through 12 show to advantage additional structure of document capture arm 16 including lobe 15 upon which document capture arm 16 pivots. Capture arm actuator 17 extends from a proximate end of document capture arm 16 and is inserted between cover 13 and platen 12. Concave surface 33 of document capture arm 16 is configured for cooperating fit with convex surface 35 of cover 13. Ridge 37 of document capture arm 16 has a cooperating fit with groove 34 of cover 13.

Figure 9:
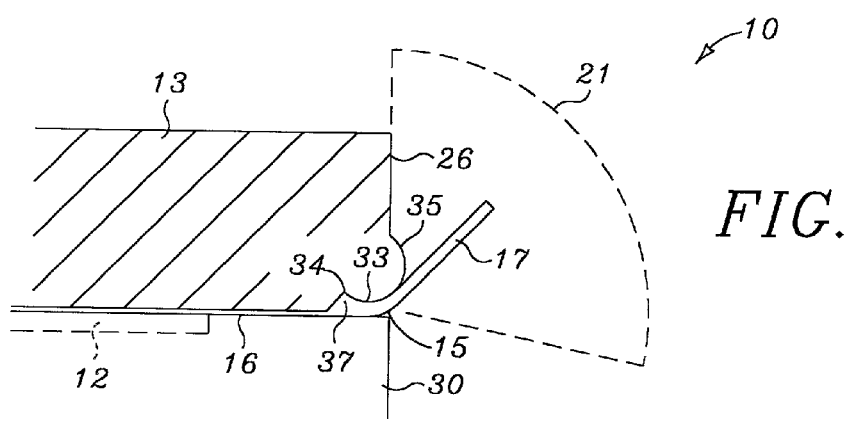
FIG. 9 is a representative side cross sectional detail of an imaging device including a document capture arm according to the invention.
Figure 10:
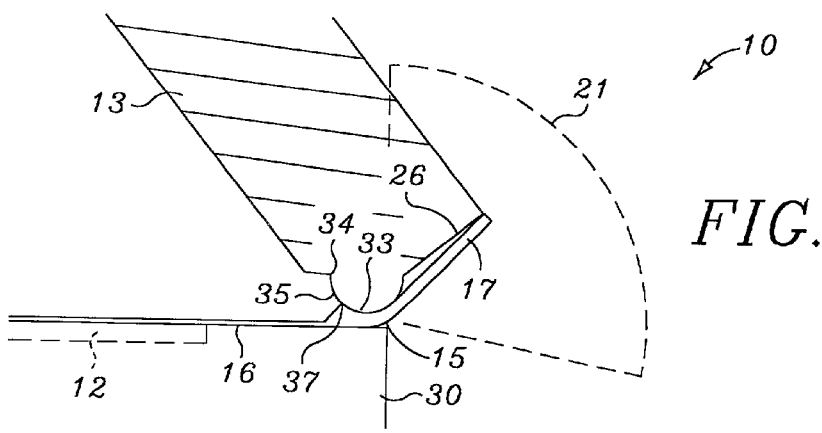
FIG. 10 is a representative side cross sectional detail of an imaging device including a document capture arm according to the invention.
Figure 11:
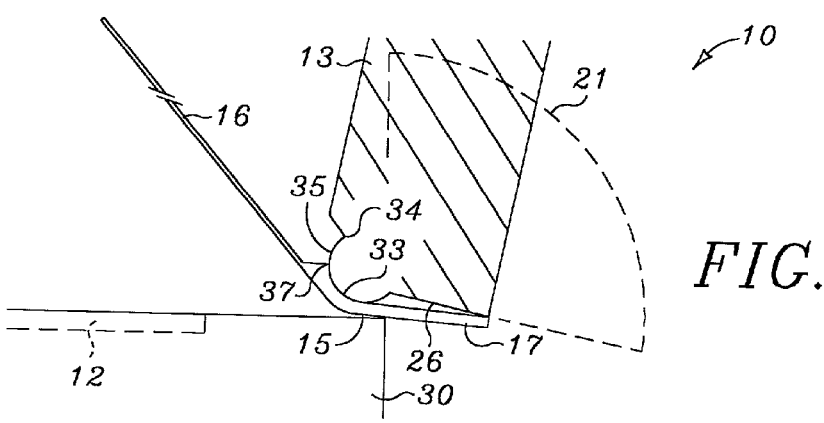
FIG. 11 is a representative side cross sectional detail of an imaging device including a document capture arm according to the invention.

FIGS. 9 through 11 show imaging device 10 including cover 13 hingedly attached to imaging device housing 30. Document capture arm 16 is disposed between cover 13 and transparent platen 12 for pivotal movement with cover 13. Document capture arm 16 includes lobe 15 upon which document capture arm 16 pivots. Capture arm actuator 17 extends from a proximate end of document capture arm 16 and is inserted between cover 13 and platen 12. Capture arm actuator 17 is positioned in opening path 21 of cover 13. When opened, rear edge 26 of cover 13 pushes capture arm actuator 17 which in turn pivots document capture arm away from platen 12. As shown in FIG. 9, when cover 13 is positioned in a fully open position, capture arm actuator 17 may be withdrawn from between cover 13 and platen 12 allowing removal of document capture arm 16.

FIG. 9 shows imaging device 10 including cover 13 in a fully closed position with document capture arm 16 lying flat between cover 13 and transparent platen 12. The cooperating fit between ridge 37 of document capture arm 16 and groove 34 of cover 13 assure that document capture arm 16 will not move when cover 13 is in the fully closed position.

As seen in FIG. 10, when cover 13 is in a partially lowered position, capture arm actuator 17 allows document capture arm 16 to lie flat against transparent platen 12 holding document D in place. In the partially lowered position, transparent platen 12 is still visible to an operator and document D can still be accessed and manipulated on transparent platen 12.

Figure 12:
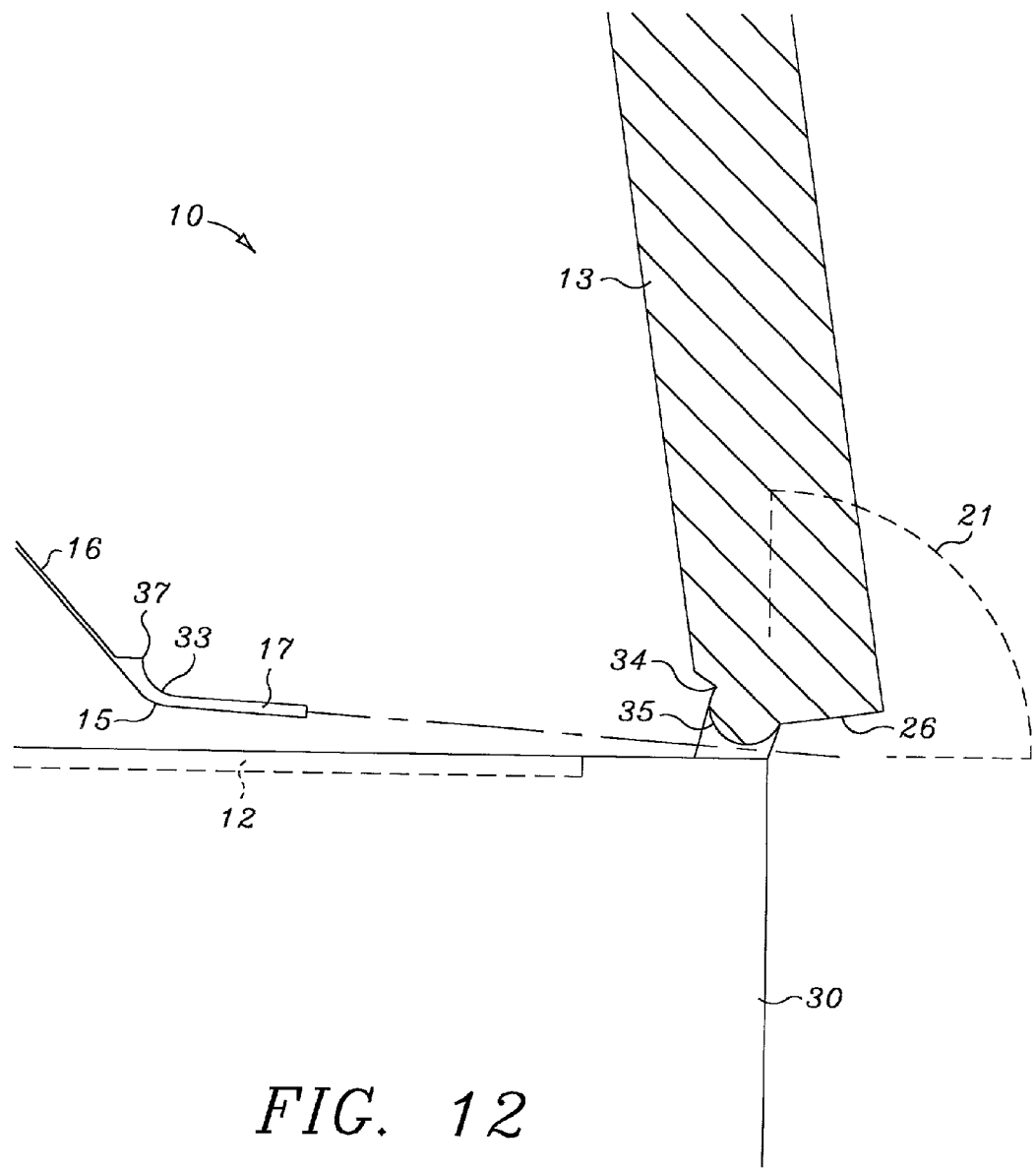
FIG. 12 is a representative side cross sectional detail of an imaging device including a document capture arm according to the invention.

FIG. 11 shows imaging device 10 including cover 13 shown in an open position. When cover 13 is lifted away from transparent platen 12, rear edge 26 of cover 13 pushes capture arm actuator 17 which in turn moves document capture arm 16 up and off of transparent platen 12. As seen in FIG. 9, capture arm actuator 17 extends at such an angle to document capture arm 16 that when cover 13 is in a fully open position, document capture arm 16 is lifted away from transparent platen 12. As shown in FIG. 12, document capture arm 16 may be removed from between transparent platen 12 and cover 13 when cover 13 is in the fully open position.

Figure 13:
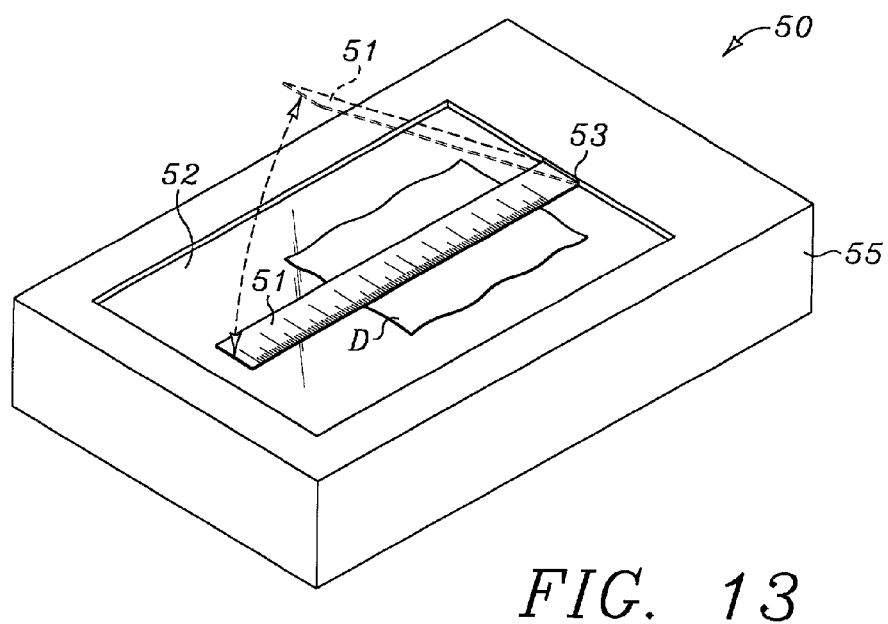
FIG. 13 is a representative perspective view of an imaging device including a document capture arm according to the invention.
Figure 14:
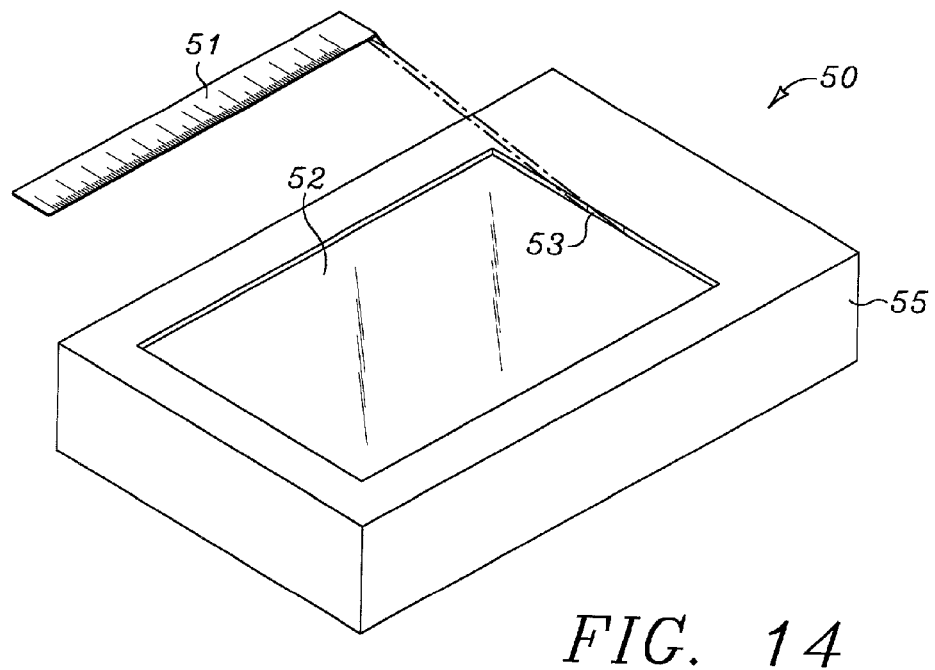
FIG. 14 is a representative perspective view of an imaging device including a document capture arm according to the invention.

FIGS. 13 and 14 show yet another embodiment of a document capture device. Imaging device 50 includes imaging device housing 55. Document capture arm 51 is positionable relative to transparent platen 52 so as to hold document D in a selected position. Document capture arm 51 is removably insertable in receiver 53.

While this invention has been described with reference to the detailed embodiments, this is not meant to be construed in a limiting sense. Various modifications to the described embodiments as well as the inclusion or exclusion of additional embodiments will be apparent to persons skilled in the art upon reference to this description. It is therefore contemplated that the appended claims will cover any such modifications or embodiments as fall within the true scope of the invention.

What is claimed is:

1. A document capture device for an imaging device comprising a document capture arm connected to the imaging device and positionable on a platen for securing a document in a selected position on the platen and a capture arm actuator attached at and extending from a proximate end of the document capture arm into an opening path of a rear edge of the cover for coordinated manipulation of the document capture arm with the cover.

2. The document capture device of claim 1 wherein the document capture arm further comprises a document capture arm removably connectable to the imaging device, the document capture arm positionable on the platen for securing a document in a selected position on the platen.

3. A document capture device for an imaging device including a platen and a platen cover, the document capture device comprising a document capture arm disposed between the platen and the platen cover, the document capture arm positionable on the platen for securing a document in a selected position on the platen and a capture arm actuator attached at and extending from a proximate end of the document capture arm into an opening path of a rear edge of the cover for coordinated manipulation of the document capture arm with the cover.

4. The document capture device of claim 3 wherein the document capture arm further comprises a document capture arm including a capture arm actuator attached at and extending from a proximate end of the document capture arm into an opening path of a rear edge of the cover for coordinated manipulation of the document capture arm with the cover.

5. The document capture device of claim 3 wherein the document capture arm further comprises a frictionally positionable document capture arm.

6. The document capture device of claim 3 wherein the document capture arm further comprises one or more indexing marks.

7. The document capture device of claim 3 wherein the document capture arm further comprises one or more air holes.

8. The document capture device of claim 3 wherein the document capture arm further comprises a document capture arm removably disposable between the platen and the platen cover, the document capture arm positionable on the platen for securing a document in a selected position on the platen.

9. The document capture device of claim 3 wherein the document capture arm further comprises a transparent material.

10. The document capture device of claim 3 wherein the document capture arm further comprises a relatively flexible material.

11. An imaging device comprising:
    an imaging device housing;
    a transparent platen forming a surface of the imaging device housing;
    a platen cover connected to the imaging device housing;
    a document capture arm connected to the imaging device, the document capture arm positionable on the platen for securing a document in a selected position on the platen; and
    a capture arm actuator attached at and extending from a proximate end of the document capture arm into an opening path of a rear edge of the cover for coordinated manipulation of the document capture arm with the cover.

12. The device of claim 11 wherein the document capture arm further comprises a document capture arm including a capture arm actuator attached at and extending from a proximate end of the document capture arm into an opening path of a rear edge of the cover for coordinated manipulation of the document capture arm with the cover.

13. The device of claim 11 wherein the document capture arm further comprises a frictionally positionable document capture arm.

14. The device of claim 11 wherein the document capture arm further comprises one or more indexing marks.

15. The device of claim 11 wherein the document capture arm further comprises one or more air holes.

16. The device of claim 11 wherein the document capture arm further comprises a removable document capture arm.

17. The device of claim 11 wherein the document capture arm further comprises a transparent material.

18. The device of claim 11 wherein the document capture arm further comprises a relatively flexible material.

19. An imaging device comprising:
    an imaging device housing;
    a transparent platen forming a surface of the imaging device housing;

a platen cover connected to the imaging device housing;
a receiver formed on the imaging device housing;
a document capture arm attached to the receiver, the document capture arm positionable over the transparent platen; and
a capture arm actuator attached at and extending from a proximate end of the document capture arm into an opening path of a rear edge of the cover for coordinated manipulation of the document capture arm with the cover.

20. The document capture device of claim 19 wherein further comprising a removable document capture arm.

* * * * *

UNITED STATES PATENT AND TRADEMARK OFFICE
CERTIFICATE OF CORRECTION

| | | |
|---|---|---|
| PATENT NO. | : 7,050,206 B2 | Page 1 of 1 |
| APPLICATION NO. | : 09/976136 | |
| DATED | : May 23, 2006 | |
| INVENTOR(S) | : David M. Payne et al. | |

It is certified that error appears in the above-identified patent and that said Letters Patent is hereby corrected as shown below:

In column 6, lines 1-6, delete "4. The document capture device of claim 3 wherein the document capture arm further comprises a document capture arm including a capture arm actuator attached at and extending from a proximate end of the document capture arm into an opening path of a rear edge of the cover for coordinated manipulation of the document capture arm with the cover.".

In column 6, lines 14-15, in Claim 7, delete "air holes." and insert -- apertures formed through a cross-section of the document capture arm. --, therefor.

In column 6, lines 43-48, delete "12. The device of claim 11 wherein the document capture arm further comprises a document capture arm including a capture arm actuator attached at and extending from a proximate end of the document capture arm into an opening path of a rear edge of the cover for coordinated manipulation of the document capture arm with the cover.".

In column 8, line 4, in Claim 20, after "claim 19" delete "wherein".

Signed and Sealed this

Twelfth Day of May, 2009

JOHN DOLL
*Acting Director of the United States Patent and Trademark Office*